UNITED STATES PATENT OFFICE.

CHRISTIAN GUSTAV CLEMM, OF DRESDEN, SAXONY, GERMANY, ASSIGNOR TO CHARLES CLEMM, OF PHILADELPHIA, PENNSYLVANIA.

IMPROVEMENT IN THE EMPLOYMENT OF MAGNESIA COMPOUNDS IN CHEMICAL MANUFACTURES.

Specification forming part of Letters Patent No. 41,349, dated January 19, 1864.

*To all whom it may concern:*

Be it known that I, CHRISTIAN GUSTAV CLEMM, of Dresden, Germany, have invented a new and Improved Method of Employment of Magnesia and its Combinations in Chemical Manufactures; and I do hereby declare that the following is a full and exact description of the invention.

Description of the different new processes for the fabrication of sulphur, sulphuric acid, sulphate of potash, sulphate of soda, soda, potash, chloride of potassium, and chlorohydric acid, and the uses to which the sub-products of them may be applied for the fabrication of other chemical products.

Preliminary Explications.

The new processes rest upon the following facts, till then, scientifically and practically, completely unknown or unused. First, kisserit, a mineral which is found in considerable masses in the salt mines of Stassfurth, in the Kingdom of Prussia, and in the Duchies of Anhalt, is an isomeric modification of sulphate of magnesia with one equivalent of water (Mg OSO$_3$+Ho,) and has altogether different properties from the latter. Second, the carbonate of magnesia with three equivalents of water (MgO,CO$_2$+3HO) dissolves with gypsum into sulphate of magnesia and carbonate of lime. Third, By the calcination of sulphate of magnesia with charcoal one obtains two volumes of sulphurous acid and one volume carbonic acid with a residuum of magnesia. Fourth, the carbonic acid disengaged by the heat from mono or bi carbonate of magnesia decomposes completely in its primative state the mono and poly sulphurets of potassium, sodium, and magnesium.

I. Method of the fabrication of sulphuric acid.

(a) *With kisserit.*—The kisserit is reduced to powder, then purified from the alkaline chlorides which it may contain by being washed in water, and afterward compressed in balls, cylindrical forms, or flat cakes, which are calcined a sufficient time in a suitable apparatus into which steam is introduced. The sulphuric acid disengages without being decomposed, and is received into leaden chambers or other condensing apparatus. If the kisserit is mixed with a little charcoal it disengages still more quickly the sulphuric acid; but part of it is thereby decomposed into sulphurous acid.

(b) *With the common sulphate of magnesia.*—It is calcined in the same manner as kisserit, with the addition of ten to fifteen per cent. of charcoal. The gases which are disengaged by this operation are composed of about two volumes of sulphurous acid and one volume of carbonic acid, and are transformed into sulphuric acid in the leaden chambers after the ordinary method.

(c) *By means of different secondary products.*

(α) *By means of sulphite of magnesia.*—The salt already disengages at a moderate heat (iu furnaces or retorts hermetically closed) its sulphurous acid. A small quantity is transformed during this operation with sulphate of magnesia; but this can be easily hindered by adding some percentages of charcoal before heating.

(β) *By means of sulphureted-hydrogen gas.*—We burn it, after the method of Hunt, and oxidize the sulphurous acid which results from its combustion by the ordinary method in the leaden chambers.

II.—Method of the fabrication of sulphate of potash, sulphate of soda, the double salts of these sulphates with the sulphate of magnesia, hydrochloric acid, and magnesia.

(A) Method of preparing sulphate of soda and its double salt with the sulphate of magnesia.

(a) *By a dry way.*—We pound very fine and mix thoroughly one equivalent of chloride of sodium and two equivalents of kisserit; or, as a thorough mixture is difficult to obtain by means of a mill, or even by mixing-vessels, the purpose is better obtained by mixing together the two substances in the least quantity of water and evaporating this dissolution in a suitable manner to the consistence of a thick panada. By the calcination of this mixture in a muffle-furnace under the influence of a current of steam we obtain the double salt (MgOSO$_3$+NaOSO$_3$) and some magnesia, and there is disengaged hydrochlorid acid. We employ for this calcination furnaces of a similar construction to those which are now used in the fabrics of sulphuric acid for the oxidation of sulphurets of zinc, (ZS,) and which are, as we know, a combination of the muffle-furnaces with the common reverberatory furnace. We calcine during some hours (as long a time as in the ordinary preparation of sulphate) the mixture in the proper muffle-furnace by causing to pass continually through it a stream of water (by preference exceedingly heated) and by raising the temperature toward the end to a blood-red heat. Then we push the mass on the second oven-hearth, where it is exposed to the immediate action of the flame, and where it can remain while it is continually stirred as long as in the first part of the furnace, so that the two divisions of the furnace are always simultaneously charged. Almost all the hydrochloric acid is disengaged from the muffle-furnace, and we condense it in the ordinary manner. The products of the combustion which come from the furnace can serve to evaporate the dissolution of which we have before spoken. This evaporation takes place in a mured furnace heated from above. It is clear that it is not absolutely necessary to employ two equivalents of kisserit. If we employ less than two equivalents, we must calcine more strongly the mass. At the end of the calcination the mass is composed of double salt ($NaOSO_3 + MgOSO_3$) and magnesia. It can be used without further preparation in the fabrication of soda by the method described lower down. If we wish to prepare with this mass the double salt ($NaOSO_3 + MgOSO_3$) it is only necessary to separate it from the magnesia by boiling water and evaporate the solution to a state of dryness in a reverberatory furnace.

To prepare pure Glauber's salt by means of this double salt there are two different ways.

(a) We saturate boiling water with the double salt, ($NaOSO_3 + MgOSO_3$,) and keep the solution some time in a boiling state. This operation is best performed in a reverberatory furnace heated from above; but we can also apply, if it is possible, for this purpose the heat lost from the sulphate-furnace. The Glauber's salt separates anhydrous under the form of a fine crystallic powder. It is immediately taken up and easily washed in the gratings which are behind the chimney and higher than the caldron where the boiling takes place. The mother-water contains all the sulphate of magnesia, with a minimum quantity of Glauber's salt. This sulphate of magnesia is obtained also by the evaporation of the solution, and serves either for the disengagement of sulphurous acid after the method given above, or for the transformation of sea-salt into Glauber's salt by means of Carré's apparatus; or, lastly, by the preparation of Glauber's salt by the humid way.

(β) The double salt ($NaOSO_3 + MgOSO_3$) is dissolved with one equivalent of sea-salt in water. This salt, if the solution is carried by a Carré's apparatus to a temperature of $+28°$ Fahrenheit, is decomposed into sulphate of soda, which crystallizes, and chloride of magnesium, which remains in solution. I have found that the sulphate of magnesia, in combination with the Glauber's salt, decomposes the sea-salt at a higher temperature than when in the free state.

(b) *By the humid way.*—The decomposition of sea-salt by kisserit, and consequently the formation of the double salt, ($NaOSO_3 + MgOSO_3$,) can also take place by the humid way—that is to say, by the simple dissolution of kisserit in a boiling solution of sea-salt. I ought to remark that in this case we can replace the two equivalents of kisserit by common sulphate of magnesia. (See above.) We separate the double salt, ($NaOSO_3 + MgOSO_3$,) as from chloride of magnesium, by drying and crystallizing it. We employ it directly; or we make of it Glauber's salt, as given in *a*.

(c) *By artificial cold.*—If we dissolve equal equivalents of sea-salt and kisserit in the least quantity possible of boiling water and expose this dissolution to a temperature of $+268°$ Fahrenheit by means of Carré's apparatus, almost all the soda precipitates to the state of Glauber's salt crystallized and very fine. The chloride of magnesium remains in dissolution with some small quantities of chloride of sodium and sulphate of magnesia. The dissolution of chloride of magnesium obtained as secondary products, by *b* and *c*, is employed in the preparation of hydrochloric acid free from sulphuric acid. For this purpose we calcine (it in the muffle-furnace mentioned above) by subjecting it to the action of steam. A moderate heat of $+390°$ till $570°$ Fahrenheit suffices to expel completely the hydrochloric acid. A part of the chloride of magnesium is prepared in a dry state, and will be brought in commerce under the domination "solid hydrochloric acid." It is true it is not entirely dishydrated. It is impossible to get rid of the water which it contains, except until there only remains twenty-five per cent.; but even with this quantity of water it produces after the cooling a solid mass containing about fifty-seven percentages of hydrochloric acid, and consequently gives out by calcination about one and three-fourths hundred-weight hydrochloric acid of $20°$ Baumé. This solid hydrochloric acid is important for those who make a great consumption of hydrochloric acid, so much the more because the magnesia that remains after the calcination of chloride of magnesium is an excellent material for the preparation of chloride combinations suitable for bleaching, for the fabrication refractory stones, for the precipitation of oxides of metals from their sulphates, for the preparation of solid carbonic acid, which we describe lower down, &c.

(B) *Manner of preparing sulphate of potash and its double salt with the sulphate of magnesia.*

We may apply to the decomposition of chloride of potassium by means of kisserit all that has been mentioned at A *a* in reference to chloride of sodium with modifications in the details. There are but two properties of sulphate of potash which the sulphate of soda does not possess.

(a) If we submit a solution of kisserit in chloride of potassium to a steam-pressure of ten atmospheres, all the potash is precipitated in the condition of sulphate free from water.

(b) If we mix with a solution of sulphate of potash or of the double salt, ($KOSO_3+MgOSO_3$,) which cannot be separated like the corresponding salt of soda, one equivalent of chloride of sodium for each equivalent of sulphuric acid contained in the solution, and that afterward the mixture is carried to a temperature 0° till 4° Fahrenheit by means of Carré's apparatus, the sulphate of potash is transformed into chloride of potassium, which remains in solution, and into sulphate of soda, (with 10 HO,) the mother-water is but a solution of artificial carnallit. If we add to the solution of the double salt ($KOSO_3+MgOSO_3$) only one equivalent of chloride of sodium, then we require but a cooling to 40° Fahrenheit to transform the sulphate of magnesia into Glauber's salt. The product of the decomposition of chloride of potassium by means of kisserit, consisting of ($KOSO_3+MgOSO_3$) and of magnesia, is the best employed, without any further preparation for the manufactory of potash.

(c) *Simultaneous preparation of the sulphates of soda and potash.*—We may, as we see without any further explanation, work simultaneously the mixtures of chloride of potassium, of chloride of sodium, and of kisserit, such as they are found naturally, according to the methods described at A and B for the purpose of obtaining the sulphates of soda and of potash or their double salts. In this case we separate the two sulphates by crystallization, (or other similar operations,) or else we transform them simultaneously into carbonates (soda and potash) and separate only these latter combinations. The separation of sulphates, as well as of carbonates of potash and of soda, are well-known operations, which offer no difficulty.

III. *Method of manufacturing soda and potash.*

In the manufactory of the sulphates, as described above, we obtain, without expense, as secondary products, great quantities of magnesia. The idea struck me to use bicarbonate of magnesia in the same way as the bicarbonate of soda for the decomposition of sulphuret of sodium, and this succeeded completely.

We may consider the carbonate of magnesia, and particularly the neutral carbonate, ($MgO Co_2$ and $_3HO$,) as solid carbonic acid. This carbonate commences already far below 212° Fahrenheit (at the contact of water) to disengage pure carbonic acid, and loses at 570° Fahrenheit all its carbonic acid; but the residuum of magnesia absorbs the carbonic acid even of very impure mixtures of products of combustion, &c., as easily as the carbonate disengages its own. It is above all the magnesia which has been heated with the carbonates of the alkalies that possesses this property in a very high degree. The preparation and realization of this solid carbonic acid is a particular part for my request for a patent for which I claim expressly the legal protection. This preparation may become of great importance for the improvement of the method of manufacturing soda of Kopp (Blyde and Benson) for the decomposition of sulphuret of barium, for the making of beet-sugar, and for many other manufactories, especially for the preparation of sulphate of magnesia by means of gypsum, (according to the method described below.) The carbonic acid disengaged from carbonate of magnesia by a moderate heat exercises naturally the same energetic action in its primary state upon the mono and poly sulphurets of alkalies and earths as the carbonic acid of bicarbonate of soda.

What has been said heretofore upon the decompositions of sulphurets of sodium by means of my solid carbonic acid, and all that is going to be mentioned hereinafter about the transformation of the sulphurets into carbonates, is also applied with the sulphurets of potassium.

*Description of the process of the proper fabrication.*

We add to the mixture of magnesia and of sulphate of soda and sulphate of magnesia, such as it comes from the decomposing-furnace, (sulphate-furnace,) twenty-four to thirty per cent. of charcoal or caking coal, with the least quantity possible of cinder reduced into fine powder, and we heat the mass in a reverberatory furnace of magnesian stone. The reduction already takes place under 1100° Fahrenheit, and the whole mass is completely melted at 1300° Fahrenheit at the utmost, whereas the mixture of Le Blanc requires 1850° Fahrenheit, and more for the fusion. We carry the melted mass into iron casks, which are hermetically closed. After the cooling it forms a solid, tender, and porous mass, which contains some sulphuret of sodium, magnesia, some carbonate of soda, and of charcoal, which was there in excess. I call this mixture the "cast." During the fusion the sulphuric acid of sulphate of magnesia is disengaged naturally under the form of sulphurous acid. If the gases which are disengaged from the melting-furnace are made to pass upon a milk of magnesia, the sulphurous acid is absorbed and forms sulphite of magnesia, which is, as we have said above, a very suitable material for the preparation of sulphurous acid. The magnesia, which is inclosed in the cast, absorbs carbonic acid still more easily than free magnesia if one exposes the cast. After having watered it to a current of carbonic acid it absorbs it with a disengagement of heat and immediately disengages sulphur.

There is formed gradually with a disengagement of sulphureted hydrogen gas (HS) neutral carbonate of magnesia and bicarbonate of soda, as well as the well-known combination of these two salts. When the disengagement of HS becomes weak saturation by carbonic acid is finished, although the mass still contains some sulphur. To expel this sulphur entirely under the form of HS it is only necessary to heat the mass to about 570° Fahrenheit. By this means the carbonic acid of the double salt and of the neutral carbonate of magnesia becomes free and decomposes completely to their primitive state all the combinations of sulphur. If the sulphur of sodium is mixed with two equivalents of magnesia, (as is the case in the cast of which we have spoken above,) there is then formed in the carbonated cast a great excess of neutral carbonic of magnesia and its double salts with the bicarbonate of soda. Consequently there only needs the expulsion of a part of the carbonic acid which it contains to decompose all the combinations of sulphur, which can already take place under 390° Fahrenheit. After this theoretic digression, let us return to the process of fabrication. The casts come first into what I call the "chambers of carbonization," (mured chambers or cylinders of zinc or any other metal,) which can be hermetically closed and contain in the interior several gratings of cast-iron placed one above the other, on which are put the casts. A whole series of such chambers are formed upon the same plan and are bound one to the other like the reservoirs, which serve for washing in the soda by methodical filtration. The casts remain in these chambers six to eight days, and are subjected during this time to a methodical carbonization, so that the carbonic acid which escapes from the first chambers, mixed with H S, is completely absorbed in the latter. During this time the casts are frequently watered. It is also necessary that the carbonic acid which is introduced should be moist. Each of the chambers is in communication on one side with the apparatus which conducts pure and moist carbonic acid, and on the other with the absorbing apparatus, wherein sulphureted-hydrogen gas is absorbed. It is unnecessary to remark that we can introduce successively in each of the chambers carbonic acid directly, and likewise effect the escape of the gas successively by each chamber. As soon as the carbonization is terminated we heat the casts to 390° to 570° Fahrenheit. This operation can be effected even in the apparatus for carbonization if one introduces there a current of highly-heated steam; but it can also take place in a second apparatus by means of heating from without, (by means of heat which escapes from a furnace.)

It seems to be superfluous to describe more in detail the construction of this apparatus, as well as that of the chambers for carbonization. These constructions have quite a subordinate importance with regard to the principal points of my discovery. Each engineer can execute them in a different manner, and there is principally to remark that the casts, during the operation of carbonization and desulphurations, should be protected as much as possible against the current of air—an aim which can be obtained in divers ways. The casts suitably carbonized with the precautions pointed to, then heated to 570° Fahrenheit, are free from sulphur and hyposulphites. They are composed of soda rich to a high degree and very pure, of magnesia, with a little charcoal; but they only require to be heated by boiling water or steam, in order to give a highly-concentrated solution of soda and a residuum of magnesia. We need only to co-operate to a dry state this solution of soda in a reverberating-furnace the floor of which is constructed of bricks of magnesia, in order to obtain a rich product in a high degree pure and of the first quality. We separate the residuum of magnesia from soda-lye, with which it is still impregnated, by means of a centrifugal machine, or by the ordinary washing in lye. It is appropriate for new operations. There is naturally required for the carbonization of the cast a pure carbonic acid free from air. It is prepared by heating in a muffled furnace (of a similar construction to the muffled furnace which serves for the preparation of the sulphate) of what I call "solid carbonic acid." We prepare the pure carbonate of magnesia by passing over the residuum of magnesia after its being washed in lye the air of a stove. We employ for this operation long mured chambers, in which are upon iron rails some light carriages, with several floors, on which we expose the hydrate of magnesia mixed with the morsels of charcoal. The magnesia absorbs the carbonic acid in presence of steam as easily as the hydrate of magnesia. We direct across these chambers, by means of a ventilator, the air of a stove, after having previously conducted it under the metallic floor of the chambers, and having evaporated the water which had been previously poured therein. The carriages remain from eight to ten days in these chambers, consequently much longer than is necessary. We draw off daily at one extremity from the number of carriages loaded with carbonate our daily use, and we push into the other extremity as many carriages charged with caustic magnesia. We direct, also by means of a Beale exhauster, the carbonic acid which is disengaged from the central carbonate of magnesia into the chambers for carbonization, after having previously mixed it with the requisite quantity of steam.

In order to avoid every surreptitious application which may be made of my discovery without infringing directly on my patent rights, I add here the following modifications of my process, which can be made use of.

First. We can replace the mixture mentioned above of double salt ($NaOSO_3 + MgOSO_3$) with magnesia by a mixture of one equivalent of Glauber's salt with one to two per cent. equivalent of magnesia or carbonate of magnesia for the manufacture of soda. In this case it is suitable to add to the mixture before the fusion, besides the coal necessary for the reduction, twenty to thirty per cent. of charcoal, anthracite, or coke in morsels of the size of a pea, in order to render the cast more porous.

Second. We can also reduce the Glauber's salt alone with charcoal, dissolve the sulphur of sodium in a little water, mix the solution with some neutral carbonate of magnesia, and afterward heat the mass to 570° Fahrenheit.

Third. We can also mix the hot solution of sulphur of sodium with the magnesia and let grow stiff the solution in its crystals, and then heat solidified mass as we do the cast.

Fourth. It is clear that we can prepare the magnesia we require in the above-mentioned operations, not only with kisserit and the chloride of magnesium, but also with other materials—for instance, with magnesit, dolomite, &c. We apply the sulphureted hydrogen gas which we have obtained as a secondary product by the decomposition of the sulphur of sodium and sulphur of potassium, either, as mentioned above, by burning it, by means of the method of Hunt, or by absorbing it according to Spence's and Gossage's method, by the oxide or protoxide of iron, or by employing it in the manufacture of sulphur.

IV. *Process of preparing sulphur.*

We decompose the sulphureted-hydrogen gas obtained as a secondary product of the manufacture of soda by sulphurous acid, according to the known methods of Persez and Fabre. We thus obtain in a pure state the sulphur from the sulphureted hydrogen gas as well as that of sulphurous acid. We may also decompose the sulphureted hydrogen gas according to Wagner's method, by means of sesquichloride of iron.

V. *Method of preparing alum and alumina.*

Under the sub-products mentioned in the commencement as appertaining to the whole belongs also that part of hydrochloric acid which is not valuable for sale. The vapors of the hydrochloric acid are caught in porous calcined clay, which gives, by dissolving, a concentrated solution of chloride of alumina. If to this solution is put one equivalent of potash, double salt, ($KOSO_3 + MgOS_3$,) with two equivalents of kisserit or artificial sulphate of magnesia, then the potash alum is precipitated and chloride of magnesia remains in solution.

In order to make the alumina pure, it is precipitated out of the purified solution of chloride of alumina with magnesia, by which operation is obtained also, as sub-product, chloride of magnesium, (solid hydrochloric or muriatic acid.)

VI. *Method of preparing sulphate of magnesia.*

We treat during a certain time, at a temperature of 122° to 158° Fahrenheit, some gypsum powdered very minutely and suspended in water, with some neutral carbonate of magnesia, ($MgOCO_2 + 3HO$,) by stirring continually. A solution of sulphate of magnesia and a residuum of carbonate of lime are then formed.

VII. *Method of preparing substances fit for the extraction of ores.*

We use for this purpose (*a*) the chloride of magnesium, which is found in the rubbish-salt of Stassfurth, and which is also obtained by the decomposing method mentioned above, (see above about the form under which it may be sent away;) (*b*) the washed kisserit, which I call "solid sulphuric acid." We expel the acids of these two salts by means of heating them in steam of water, and we direct afterward the acids in the form of steam to the ores. We may also very naturally condense the acid vapors and use them under a liquid form for the extraction of ores.

It has long since been known that poor ores can only be employed advantageously in the neighborhood of the mines from whence they are extracted, and consequently one is compelled to transport the acids requisite for the extraction to the mines. Railways or even good roads very seldom lead to them, and then the transport of the acids in glass or earthen baloons or carboys is often impossible; but the solid acids in question may, on the other hand, be transported everywhere, since they may be forwarded in casks, or even, if necessary, simply loaded upon open carts.

Lastly, I must show the superiority of the new method for soda and potash fabrications compared with the now used method of LeBlanc.

First. The melting process requires through the new method less heat, burning materials, and consequently less time than the general method, because no limestones require to be melted with it. The evaporation of sodium is also much less.

Second. By the common manner of preparation the double combinations of the silicates of lime and soda, as well as the sulphates of sodium and calcium, which are constantly formed, remain unsoluble in the sodium residuum; but this by the new method cannot take place, because the salts are free from kisserit and sulphuret of magnesia, and cannot form double combinations.

From the above and two given reasons the new method diminishes almost entirely the enormous loss of soda after LeBlanc's method. It is known that even in the best factories, working with the purest materials, the loss amounts to from sixteen to eighteen per cent.; but in other factories from twenty-three to twenty-four per cent.

To this comes—Third. By the use of the new method the sulphur contents of the sulphate are again won, ($C^a44$ pounds sulphur on one hundred pounds pure soda,) which by LeBlanc's method are entirely lost.

In the already-mentioned uses of magnesia and its combinations in the industry are in-included the following:

First. The production of pure zinc and copper oxide through precipitation of the same, with the help of magnesia out of the solution of their sulphates, or by roasting the sulphurets of both metals with magnesia and extracting the roasted mass with water. I use the so received oxides to produce oxide of barium, and with the help of this latter I produce caustic alkalies from their sulphates. The production of oxide of barium with oxide of zinc goes very well if the sulphates of barium are not perfectly decomposed with oxide of zinc. The last part of it must be made free of sulphur through sulphate of zinc or sulphate of copper.

Second. Production of acetate of magnesia (decomposition of the same with muriatic acid for the production of acetic acid) and reproduction of the muriatic acid from chloride of magnesia by the described manner.

Third. The described method of fabrication of soda-ash has also a great value for alkali-works. After LeBlanc's method, if it is used by working the sulphur-containing mother-liquors which exist in such large scales in all alkali-works, and also for the purifying of sulphur containing raw soda salt, (soda-ash,) which by the in England now used method for the fabrication of caustic soda are brought forth in enormous quantities.

For these purposes my method is of the greatest value, because the magnesia decomposes also the combinations of the alkalies with silicates and alumina, and forms with these two substances unsoluble combinations.

Fourth. Instead of the artificial carbonate of magnesia by all the before-mentioned methods, natural magnesia, hydro-magnesit, dolomite, &c., can of course be used.

Lastly. I hereby expressly declare that I consider the following (from "first" to "fifth") described chemical processes as useful helps for the carrying into execution of my new invention, but not as my own particular invention: First, the decomposition of sulphate of magnesia with carbon; second, the decomposition of chloride of magnesia by the help of heat and steam; third, the decomposition of sulphurate of hydrogen with sulphurous acid; fourth, the production of sulphate of magnesia from gypsum and carbonate of magnesia; fifth, the separation of sulphate of soda with the help of Carré's apparatus, and the formation of sulphate of potash with the help of steam-pressure through ten atmospheres.

I claim—

The practical introduction of these chemical processes in the chemical industry in the above-described communications.

CHRISTIAN GUSTAV CLEMM.

Witnesses:
 Dr. G. KERNER,
 AUGUST GLASS.